United States Patent [19]
Cook et al.

[11] Patent Number: 5,557,227
[45] Date of Patent: Sep. 17, 1996

[54] ECONOMICAL GENERATION OF EXPONENTIAL AND PSEUDO-EXPONENTIAL DECAY FUNCTIONS IN DIGITAL HARDWARE

[75] Inventors: Perry R. Cook, Palo Alto; Bryan J. Colvin, Sr., San Jose, both of Calif.

[73] Assignee: Aureal Semiconductor, Fremont, Calif.

[21] Appl. No.: 224,442

[22] Filed: Apr. 7, 1994

[51] Int. Cl.$^6$ .................................................. G06F 7/556
[52] U.S. Cl. ............................................ 327/346; 327/356
[58] Field of Search ..................... 84/627, 663; 327/346, 327/347, 348, 349, 356, 358; 364/722, 724.17, 736, 813, 857

[56] References Cited

U.S. PATENT DOCUMENTS

| | | |
|---|---|---|
| 4,267,763 | 5/1981 | Futamase et al. . |
| 4,928,569 | 5/1990 | Kudo et al. ................................ 84/626 |
| 5,142,489 | 8/1992 | Yamaki .................... 364/736 |

Primary Examiner—Timothy P. Callahan
Assistant Examiner—Jeffrey Zweizig
Attorney, Agent, or Firm—Claude A. S. Hamrick; Emil C. Chang

[57] ABSTRACT

Exponential and pseudo-exponential decay function values are generated by scaling a fractional decrease per sampling period by a previous decay function value and then subtracting the scaled fractional decrease from the previous decay function value. In one embodiment, a multiplier multiplies the fractional decrease by the previous decay function value and provides a product signal representing the scaled fractional decrease. An adder subtracts the scaled fractional decrease from the previous decay function value. In another embodiment, a shift block replaces the multiplier and approximates multiplication by a binary shift of the fractional decrease. The size of the shift is determined by the previous magnitude of the decay function as indicated by a priority encoder. Shifting generates a pseudo-exponential decay function which is suitable for music synthesis and can be generated quickly using less expensive hardware.

13 Claims, 1 Drawing Sheet

ECONOMICAL GENERATION OF EXPONENTIAL AND PSEUDO-EXPONENTIAL DECAY FUNCTIONS IN DIGITAL HARDWARE

BACKGROUND OF THE INVENTION

1. Field of the Invention

This invention relates to using digital hardware to generate a sequence of values representing points on an exponential or pseudo-exponential decay curve.

2. Description of Related Art

Exponential decays occur frequently in nature and are often emulated by digital hardware. Music synthesizers are a prime example of digital signal processors which emulate exponential decays. Music synthesizers often generate ADSR (attack, decay, sustain, and release) curves which include exponential decay sections that mimic the drop in volume of a musical note. For example, a synthesizer which emulates a piano typically generates a sound envelope which decreases exponentially as the volume of a struck note dies out. The duration of the exponential decay depends upon the note and can last as long as thirty seconds or more for the deepest notes on a piano.

Mathematically, an exponential decay can be expressed as a function of time $$x(t) = x_0 * r^{\alpha t} \qquad \text{(eq. 1)}$$

where $x(t)$ is the decay function at time t, $x_0$ is the initial value of the decay function (at time t=0), $\alpha$ is a constant with dimensions of inverse time, and r is a fixed exponential base less than one. The constant $\alpha$ and exponential base r determine the rate-of-decease characteristic of the decay function $x(t)$.

For digital processors, time t takes on discrete values, typically an integer n times a constant sampling period $\tau$. Accordingly, the decay function is a series of values $$x_n = x(n*\tau) = x_0 * r^{\alpha n \tau} = x_0 * nR \qquad \text{(eq. 2)}$$

where a new exponential base R equals $r^{\alpha \tau}$ and is less than one. Eq. 2 can be reformulated as an iterative relation $$x_n = (x_0 * R^{n-1}) * R = x_{n-1} * R \qquad \text{(eq. 3)}$$

For the standard CD (compact disk) sampling rate of 44.1 KHz, the sampling period T is about $2.27 \times 10^{-5}$ seconds. Such sampling periods result in exponential bases R that are very close to one, especially for long decay times. Assuming that a sound envelope provides 16-bit values with an initial maximum value of 65536 which decays to the minimum non-zero value of 1 in 30 second, eq. 2 requires that $$x_n = 1 = x_0 * R^n = 65,536 * R^{(30 \text{ seconds} \times 44.1 \text{ Khz})}$$

As a result, R is 0.999991617. The closest 16-bit value to 0.999991617 is 65,535/65,536=0.999984741, which, in sq. 2, only yields a 20 second decay. To provide a 30 second decay, more than sixteen bits are required to represent R, and a multiplier with an input bus larger than 16-bits is required to determine decay function values if the multiplication in eq. 3 is carried out in a single step.

Truncation error in digital calculations further complicates accurate generation of an exponential decay. Truncating the product $x_{n-1} * R$ to sixteen bits decreases the decay function by one every sampling period, and provides a linear decrease from 65,536 to 0. The resulting total decay time is only 1.49 seconds at a 44.1-KHz sampling rate. At least 20-bit values $x_n$ and a multiplier with a 20-bit input bus are required to achieve a 16-bit decay function with a 30 second decay, but even with 20-bit values, truncation of products to 20 bits results in a linear, not exponential, decay. Still larger multipliers are required to provide an acceptable 16-bit approximation of an exponential decay. Such multipliers are expensive and often slow.

Accordingly, methods and circuits are needed that permit fast calculation of exponential decay functions using smaller or no multipliers.

SUMMARY OF THE INVENTION

In accordance with the present invention, decay function generators generate a series of values representing a decay function that has a characteristic fractional decrease per sampling period. The decay function generators include a scaling block which scales the fractional decrease by an amount depending on a previous decay function value, and an adder which subtracts the scaled fractional decrease from the previous decay function value to generate a new decay function value.

In one embodiment of the invention, the decay function is exponential, and the scaling block is a circuit which multiplies the fractional decrease by the previous decay function value. For many applications, including music synthesizers, the fractional decrease is small and can be expressed accurately using fewer bits than are required to express the exponential base of the decay function. Accordingly, a smaller multiplier can be employed which makes the decay function generator less expensive than generators which multiply by the exponential base when generating values of an exponential decay function.

In another embodiment of the invention, the scaling circuit includes a priority encoder which provides a value N indicating the most significant non-zero bit in the previous decay function value, and a shift circuit which shifts the fractional decrease by an amount determined by N. Because shifting a binary representation of a number is equivalent to multiplication by a power of two, the shift circuit approximates the action of a multiplier, and the decay function is pseudo-exponential. The pseudo-exponential decay function can replace exponential decay functions in musical instrument processors, and can be implemented inexpensively to provide fast performance without a multiplier.

Also in accordance with the present invention are methods for generating a series of digital values representing an exponential or pseudo-exponential function. The methods may be implemented by storing a value from the series, scaling a fractional decrease characteristic of the decay function by an amount which is determined by the stored value, and generating the next value in the series by subtracting the scaled fractional decrease from the stored value. Typically, the series is generated by repeated subtractions. The scaling of the fractional decrease may be accomplished by multiplication or by shifting a binary representation of the fractional decrease.

BRIEF DESCRIPTION OF THE DRAWINGS

Similar or identical items in different figures have the same reference symbols.

DETAILED DESCRIPTION OF THE PREFERRED EMBODIMENTS

By adding and subtracting $x_{n-1}$ on the righthand side of eq. 3, the following equation is obtained:

$$x_n = x_{n-1} - x_{n-1} * (1-R) \qquad \text{(eq. 4)}.$$

In a digital system, eq. 4 has an advantages over eq. 3. One advantage is that (1-R) may be accurately expressed using fewer bits than are typically required to express R. For example, for a 44.1-KHz sampling rate and a 30 second decay, R is 0.999991617, but (1-R) is $8.383 \times 10^{-6}$. (1-R) with four significant digits has the same accuracy as R with nine significant digits. Accordingly, a smaller multiplier with multiplicand (1-R) provides the same accuracy as a larger multiplier with multiplicand R.

Figure 1:
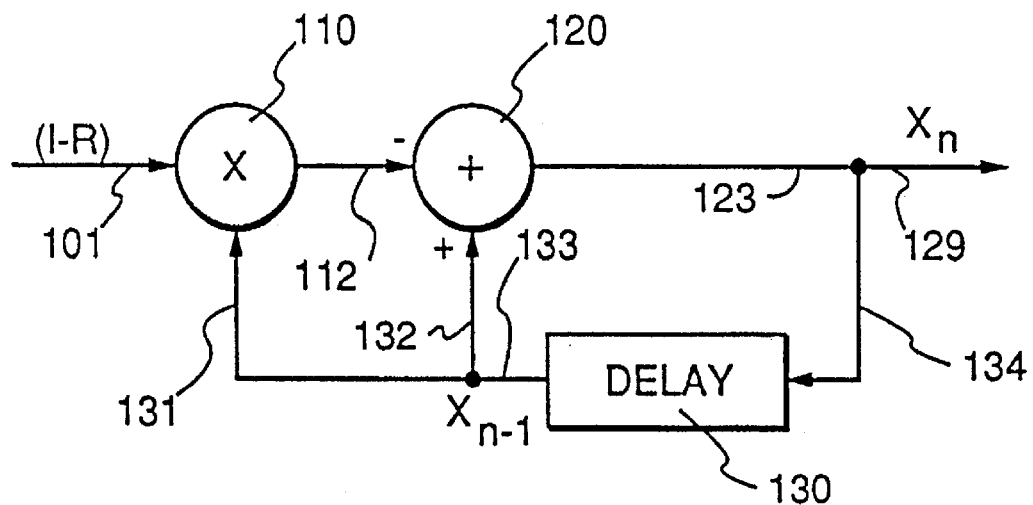
FIG. 1 shows a block diagram of an exponential decay signal generator in accordance with present invention.

FIG. 1 shows a block diagram of an exponential decay function generator in accordance with present invention. The exponential decay function generator generates a series of digital values $x_n$ representing points on an exponential decay curve. Two input values, $x_0$ and the difference (1-R), are required to determine the duration and magnitude of the decay function. Initially, $x_0$ is stored in a delay 130 then successive values $x_n$ in the series are determined from previous values $x_{n-1}$ using an iterative method disclosed below.

The exponential decay function generator of FIG. 1 may be implemented in hardware or in software. In hardware, a previous value $x_{n-1}$ of the decay function is applied by a digital delay 130 to an input bus 131 of a multiplier 110. Multipliers such as multiplier 110 are well known in the art. Digital delay 130 may be, for example, a latch, a register, or a portion of a memory such as RAM which holds the previous decay function value. Input bus 131 typically carries a multi-bit signal representing an integer, but a fixed point or floating point representation may be provided instead.

A signal representing difference (1-R), in either a fixed point or a floating point representation, is applied to a bus 101 of multiplier 110. For fixed point representations, each bit on bus 101 corresponds to a different power of two chosen according to a desired range and accuracy of decay times. For example, seven bits can correspond to the powers $2^{-11}$ to $2^{-17}$ and provide (1-R) values between $1 \times 2^{-17}$ (about $7.63 \times 10^{-6}$) and $1 \times 2^{-11} + 1 \times 2^{-12} + \ldots 1 \times 2^{-17}$ (about $9.76 \times 10^{-4}$).

Multiplier 110 provides a multi-bit product signal to bus 112 representing a product value $(1-R) * x_{n-1}$. The product signal on a bus 112 is typically a fixed point representation within a range that depends on (1-R). An adder 120 subtracts the product value supplied on bus 112 from the previous value $x_{n-1}$ supplied on a bus 132 by digital delay 130 and provides the new decay function value $x_n$ on bus 123. Digital adders and accumulators are well known in the art and in some embodiments, may be combined with multiplier 110 as part of a combined multiplier-accumulator. Digital delay 130 stores the new decay function value $x_n$ for use in the next iteration.

Bus 123 carries an internal signal representing the decay function value $x_n$. An output bus 129 carries output decay function value $x_n$ for use by an external circuit (not shown).

Typically, bus 129 has fewer lines than bus 123, and bus 129 carries only the most significant bits of the value $x_n$ on bus 123. In some situations, the decease in the decay function during a single sampling period is only in the least significant bits of the internal signal so that no change occurs in the signal on bus 129. If, in such situations, additional bits were not kept internally in delay 130 or not processed by adder 120, the decay function values $x_n$ would not decrease. Delay 130 and adder 120 accumulate fractional changes and maintain a more accurate exponential decay value.

A limiter may be employed in multiplier 110 to ensure that if the value (1-R) on bus 101 is not zero, then the product value $(1-R) * x_{n-1}$ on bus 112 will not indicate a fractional change that is zero. If the product value $(1-R) * x_{n-1}$ would be zero to the accuracy of multiplier 110, the limiter sets the least significant bit in the product value to 1 so that the internal exponential decay function value $x_n$ on bus 123 is less than previous decay function value $x_n$. A limiter is less important for larger internal data paths and is unnecessary if bus 112 and in the rest of the internal data path is sufficient to represent the least possible non-zero product from multiplier 110.

In an example embodiment, bus 101 has seven lines, bus 131 has sixteen lines, and multiplier 110 is a 7-bit-by-16-bit multiplier. The signal on bus 101 represent a fixed point fraction with the most to least significant bits representing powers of two from $2^{-11}$ to $2^{-17}$. Delay 130 provides a 21-bit fixed point value having a 20-bit fractional part therefore representing a number between 0 and 2. The sixteen most significant bits are provided on bus 131 to multiplier 110. Bus 112 has 21 lines for a signal representing 21-bit fixed point values having a 20-bit fractional part, and adder 120 is a 21-bit-by-21-bit adder. This example embodiment is sufficient for decays from about 0.26 seconds up to 33 seconds at a 44.1KHz sampling rate.

In the example embodiment, the internal data path, buses 123, 132, 133, and 134 have 21 lines, while output bus 129 has 16 lines. The sixteen most significant bits on buses 123 and 133 represent the desired output decay function value $x_n$ on bus 129 and the previous decay function value $x_n$ on bus 131, respectively. The five least significant bits of the internal decay function values $x_n$ on bus 123 and $x_{n-1}$ on bus 133 are truncated to provide the values on buses 129 and 131 respectively. Alternatively, the fixed point values $x_n$ on bus 129 and on bus 131 may be rounded up or down from the values on buses 123 and 133 respectively.

Figure 2:
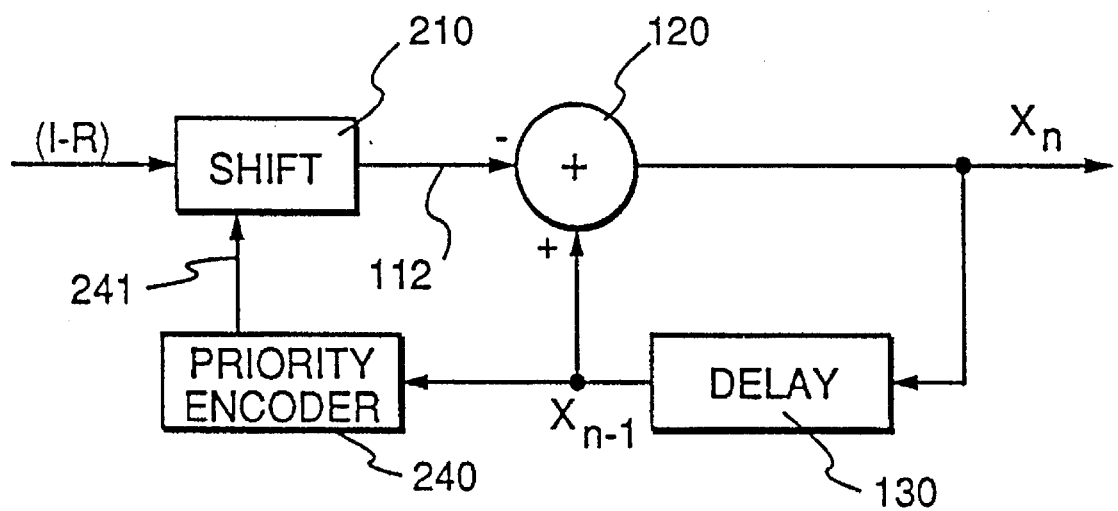
FIG. 2 shows a block diagram of a pseudo-exponential decay signal generator in accordance with present invention.

FIG. 2 shows a block diagram of an embodiment of a pseudo-exponential decay function generator in accordance with present invention. FIG. 2 differs from FIG. 1 in that multiplier 110 in FIG. 1 is replaced by a shift block 210 and a priority encoder 240 in FIG. 2. In a hardware implementation, shift block 210 is typically a shift register or an adder, and priority encoder 240 may be random logic which determines the highest set bit in the value $x_{n-1}$ or a commercially available priority encoder such as a DM9318/DM8318 available from National Semiconductor Corporation. Shift block 210 and priority encoder 240 typically are faster than a multiplier and can be fabricated in an integrated circuit less expensively than a multiplier.

Instead of multiplying (1-R) by $x_{n-1}$, as in FIG. 1, shift block 210 of FIG. 2 shifts the value (1-R) a number of bits which depends on the previous decay function value $x_{n-1}$. Shifting a binary representation of (1-R) is equivalent to multiplication by a power of two. Priority encoder 240 determines the highest set bit in value $x_{n-1}$ and provides a signal to shift block 210 via a bus 241. Shift block 210 shifts (1-R) the amount indicated on bus 241.

In FIG. 2, the signal on bus 112 represents the product of (1-R) and $2^s$, where $2^s$ is the largest power of two which less than or equal to $x_{n-1}$. When the previous value $x_{n-1}$ equals $2^s$, shift block 210 provides the same result as a multiplication of (1-R) by $x_{n-1}$. In other cases, $(1-R)*2^s$ is less than $(1-R)*x_{n-1}$. In the worst case, $x_{n-1}$ is (111 . . . 1) binary, $2^s$ is (100 . . . 0) binary, and shift block 210 provide a result that is almost 50% lower than multiplication. On average, the decrease per sampling period for the pseudo-exponential decay function is about 25% lower than the decrease for an exponential decay function. To compensate for the consistent underestimation of the decrease in the decay function, an adjusted fractional decrease a which equals 1.25*(1-R) may be used in place of (1-R).

Shift block 210 and priority encoder 240 approximate multiplication, and the generated decay function values $x_n$ are approximately exponential. This approximation is referred to herein as pseudo-exponential decay. Pseudo-exponential decay functions have been found to be suitable replacements for exponential decay functions in music synthesis.

In one specific example of a pseudo-exponential decay function signal generator, fractional decrease $\Delta$ is an 6-bit floating point value with a 2-bit mantissa and a 4-bit signed exponent. Delay 130 stores a 32-bit integer value $x_{n-1}$. Priority encoder 240 provides a 5-bit priority value on bus 241 indicating the most significant non-zero bit in the value $x_n$. Shift block 210 adds the 5-bit priority value to the exponent of the floating point representation of (1-R). Adder 120 subtracts the result from shift block 210 from the 32-bit value $x_{n-1}$. (Adder 120 adds the 2-bit mantissa of the value (1-R) to the appropriate bits in the representation of value $x_{n-1}$. The appropriate bits are selected according to the exponent of the result from shift block 210.) The resulting range of decay times for this embodiment is from about I millisecond to about 40 seconds at a 44.1-KHz sampling rate.

Appendix A contains a C language program listing of a software embodiment of pseudo-exponential decay function generator which can be compiled using an I standard C compiler which defines an integer (int) as a 16-bit value and a long integer (long int) as a 32-bit value. In Appendix A, the main program determines the number of increments (the time) required for the output exponential decay value out_value to fall to zero. Long int variable env_value holds a 21-bit decay function value having a 20-bit fractional part. A function find_high_bit acts as a priority encoder and determines the most significant non-zero bit high_bit of the decay function value env_value. Long int variable one_minus_r holds the value (1-R) also with a 20 bit fractional part. Only the low byte of one_minus_r is non-zero so that (1-R) ranges between about $2^{-12}$ to $2^{-20}$.

The fractional change delta value per time increment is determined by multiplying one_minus_r by the largest power of two less than or equal to the decay value env_value. (Multiplication by a power of two is equivalent to a shift.) The largest power of two less than or equal to env_value is high_bit minus 21. Accordingly, one_minus_r is shifted to the left 21 minus high_bit bits. The fractional change delta_value is then subtracted from the decay function value env_value. The output decay function value out_value is determined by shifting env_value to the right 5 bits to remove the least significant bits.

Appendix B contains a C language program listing of a software embodiment of exponential decay function generator which can be compiled using an ANSI standard C compiler which defines an int as a 16-bit value and a long as a 32-bit value. The main program in Appendix B is similar to the main program in Appendix A, but differs from the main program in Appendix A at least in that the fractional change delta_value per time increment is determined by multiplying one_minus_r by the decay value env value.

Although the present invention has been described with reference to particular embodiments, the description is only an example of the invention's application and should not be taken as a limitation. For example, although the embodiments disclosed subtract a positive fractional decrease from a previous decay function value, adding a negative fractional decrease is completely equivalent. Further, buses of any size, including a single line, using either parallel or series data transmission may be employ in embodiments in accordance with the present invention. Software implementations are not limited to any particular routines, or any particular compilers, or to any particular programming language. Accordingly, various modifications, adaptations, substitutions and combinations of different features of the specific embodiments can be practiced without departing from the scope of the invention set forth in the appended claims.

APENDIX A

```
#include <stdio.h>
#include <stdlib.h>
#include <math.h>
#include <string.h>
/* Pseudo-exponential envelope generation test program */
int find_high_bit(long int number) //Find highest set bit in number
{
    int i=0;
    long j=1;
    while(j<number)     {
        i = i+1;
        i = j << 1;
    }
    return i;
}
/*********************************************************/
/***************** MAIN ****************************/
/*********************************************************/
void main(int argc, char *argv[] ) {
    FILE *file_out;
    long env_value=65535*32;         // 21 bit envelope value
    long r_value=0;                  // Exponential decay
    long one_minus_r,                // 7 bit decay multiplier
    long delta_value;                // Amount subtracted
    long out_value=65535;            // 16 bit output
    long time=0;                     // Time counter
    int high_bit;                    // Highest set bit in envelope
    int notDone=1;                   // Flag
    file_out = fopen(argv[2],"wb");
    if (file_out && argc==3)     {
        r_value = atoi(argv[1]);
        one_minus_r = 256 - r_value;    // Setup 1-R
        one_minus_r = one_minus_r << 1;    // Align it
        while (notDone)    {          // Loop until 0
            high_bit = find_high_bit(env_    // Get high bit
            value);
            delta_value = one_minus_r>>(21 -    // Calculate delta
            high_bit);
            if (delta_value<1) delta_value = // Limit check
            1;
            env_value = env_value - delta_    // New Envelope Value
            value;
            out_value = env_value>>5;    // Make 16 bits
//          print("Time=%li, env=%li ",time,out_value);// Print to Screen
            if (out_value==0)notDone = 0;    // Check for end
            time+=1;                 // Increment time
        }
        printf("Total samples of decay:%li ",    // Printout time
        time);
        fclose(file_out);
    }
    else {
        printf("Filename problems. Useage: exponenv r_value file-
        Name ");
```

APENDIX A-continued

```
        printf("Where r_value is an integer from 1 to 255 ");
    }
    exit(0);
}
#include <stdio.h>
#include <stdlib.h>
#include <math.h>
#include <string.h>
/* Exponential envelope generation test program */
/**********************************************************/
/***************** MAIN *****************************/
/**********************************************************/
void main(int argc, char *argv[]) {
    FILE *file_out;
    long env_value=65535*32;       // 21 bit envelope value
    long r_value=0;                // Exponential decay
    long one_minus_r,              // 7 bit decay multiplier
    long delta_value;              // Amount subtracted
    long out_value=65535;          // 16 bit output
    long time=0;                   // Time counter
    int temp;
    int notDone=1;                 //Flag
    file_out = fopen(argv[2],"wb");
    if (file_out&&argc==3)   {
        r_value = atoi(argv[1]);
        one_minus_r = 256 - r_value;    // Setup 1-R
        while (notDone)   {             // Loop until 0
            delta_value = out_value * one_minus_r;      // Calculate delta
            delta_value = delta_value >> 14;    // Align delta
            if(delta_value<1) delta_value =1;   // Limit check
            env_value = env_value - delta_      // New Envelope Value
                value;
            out_value = env_value >> 5;         // Make 16 bits
//          printf("Time=%li, env=%li ",time,out_value);// Print to Screen
            if(out_value==0) notDone = 0;       // Check for end
            time += 1;                          // Increment time
        }
        printf("Total samples of decay: %li ",   // Print out time
            time);
        fclose(file_out);
    }
    else {
        printf("Filename problems. Useage: exponenv r_value fileName ");
        printf("Where r_value is an integer from 1 to 255 ");
    }
    exit(0);
}
```

We claim:

1. A decay function generator responsive to a fractional decrease characteristic and operative to generate a new decay function value, comprising:

means for scaling a fractional decrease characteristic of a decay function by an amount depending on a previous decay function value to provide a scaled fractional decrease;

means for decreasing the previous decay function value by the scaled fractional decrease to provide a new decay function value; and means for storing the previous decay function value, and for providing the previous decay function value to the scaling means and the decreasing means.

2. The decay function generator of claim 1, further comprising means for replacing the previous decay function value by the new decay function value.

3. The decay function generator of claim 2, wherein the scaled fractional decrease is the product of the fractional decrease and the previous decay function value.

4. The decay function generator of claim 2, wherein the scaled fractional decrease is the fractional decrease shifted by an amount that depends on the previous decay function value.

5. The decay function generator of claim 2, wherein the scaled fractional decrease is the product of the fractional decrease and the largest power of two which is smaller than the previous decay function value.

6. A decay function generator responsive to a fractional decrease characteristic and operative to generate a new decay function value, comprising:

a multiplier having a first input bus for receiving the fractional decrease characteristic, a second input bus for receiving a delayed decay function value, and an output bus;

an adder having a first input bus, a second input bus for receiving the delayed decay function value, and an output bus upon which a new decay function value is output, the first input bus of the adder being coupled to the output bus of the multiplier; and a delay circuit for delaying the new decay function value and developing the delayed function value, said delay circuit having an input bus coupled to the output bus of the adder for receiving the new decay function value, and an output bus for coupling the delayed function value to the first input bus of the multiplier and to the second input bus of the adder.

7. A decay function generator, comprising:

a shift circuit having a first input bus, a second input bus, and an output bus;

a priority encoder having an input bus and an output bus, the output bus being coupled to the second input bus of the shift circuit;

an adder having a first input bus, a second input bus, and an output bus, the first input bus of the adder being coupled to the output bus of the shift circuit; and a storage circuit having an input bus coupled to the output bus of the adder, and an output bus coupled to the input bus of the priority encoder and to the second input bus of the adder.

8. A method for generating a series of digital values representing points on a decay function, comprising the steps of:

(a) storing a value from the series;

(b) scaling a fractional decrease characteristic of the decay function by an amount which is determined by the stored value; and (c) subtracting the scaled fractional decrease from the stored value to generate a value which follows the stored value in the series.

9. The method of claim 8, further comprising:

(d) replacing the stored value with the value generated in step (c); and (e) repeating steps (b), (c), and (d) one or more times.

10. The method of claim 9, wherein step (b) further comprises:

providing a multiplier with a signal indicating the fractional decrease and a signal indicating the stored value; and operating the multiplier to provide a signal representing the product of the stored value and the fractional decrease, wherein the product is the scaled fractional decrease.

11. The method of claim 10, wherein:

the fractional decrease is the difference between an exponential base R and one; and the decay function is an exponential decay function.

12. The method of claim 9, wherein the step (b) further comprises:

generating a shift signal indicating the most significant set bit in a binary representation of the stored value; and shifting a binary representation of the fractional decrease by a number of bits which is determined by the shift signal, wherein the shifted binary representation is the scaled fractional decrease.

13. The method of claim 12, wherein the scaled fractional decrease equals the product of the fractional decrease and the greatest power of two which is less than or equal to the value in the digital delay.

* * * * *